Sept. 13, 1927.                H. J. MACKEY                1,641,980
                         SODA FOUNTAIN REFRIGERATOR
                            Filed Sept. 24, 1925
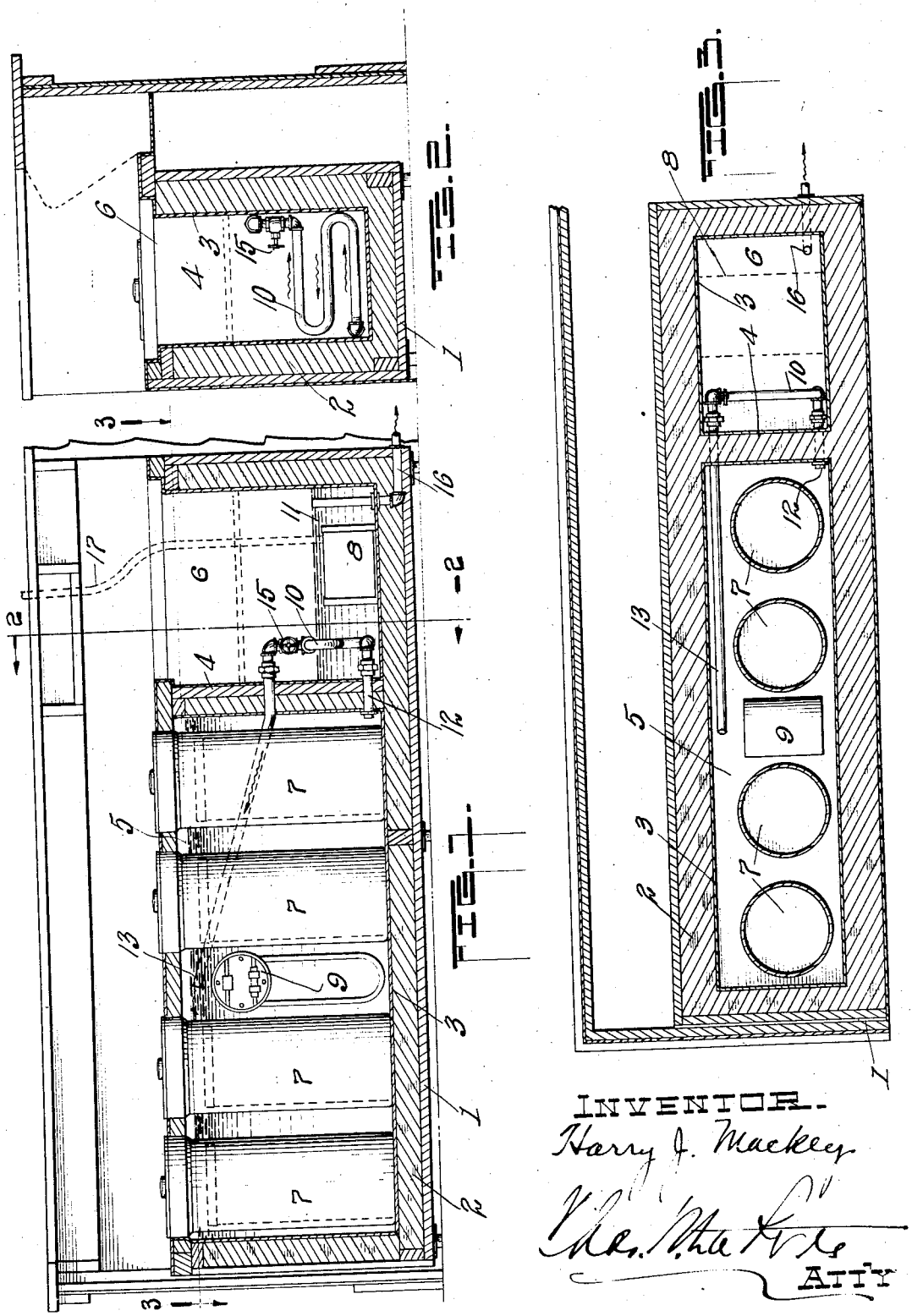
INVENTOR.
Harry J. Mackey
ATTY Patented Sept. 13, 1927.

1,641,980

UNITED STATES PATENT OFFICE

HARRY J. MACKEY, OF DECATUR, ILLINOIS, ASSIGNOR TO THE COMBINATION FOUNTAIN CO., OF DECATUR, ILLINOIS, A CORPORATION OF ILLINOIS.

SODA-FOUNTAIN REFRIGERATOR.

Application filed September 24, 1925. Serial No. 58,242.

This invention relates to certain new and useful improvements in soda fountain refrigerators, and the primary object thereof is to provide a device of this characer which embodies an ice cream compartment and a combined storage and cooling compartment with novel means for effecting circulation of brine or the like from the ice cream compartment through the storage compartment so as to cool the latter.

The invention further aims to provide novel cooling means wherein the cooling media after leaving the cooling compartment is discharged next to the cooling unit so as to have its temperature lowered prior to coming in contact with the main body of the cooling media in the ice cream compartment.

That the invention may be more fully understood, reference is had to the accompanying drawings forming a part of the present description, illustrating a preferred embodiment of the invention, in which:—

Figure 1 is a longitudinal vertical sectional view of the invention;

Figure 2 is a section on line 2—2 of Figure 1, and

Figure 3 is a section on line 3—3 of Figure 1.

Like characters of reference denote corresponding parts throughout the figures.

In proceeding in accordance with the present invention, a case or box 1 is employed which may be provided with heat insulation 2 and a preferably copper lining 3. A partition 4 separates or divides the box into an ice cream compartment 5 and a combined cooling and storage compartment 6. The usual ice cream cans 7 are disposed in the compartment 5, while a sweet water or soda water tank or other container 8 is disposed in the cooling and storage compartment 6.

At preferably the upper part of the center of the ice cream compartment is located the boiler 9 of a refrigerating unit which latter may be of any desired type. A coil 10 is located in the cooling compartment 6 and has approximately one-third thereof disposed above the surface or level of water 11 in the bottom of the compartment 6. The coil 10 has its lower end connected to a pipe which leads into the compartment 5 and has its upper end connected to a long inclined pipe 13 which latter discharges in the compartment 5 below the level of the solution in the ice cream compartment and at a point so as to egress closely adjacent to the boiler 9 of the refrigerator unit, thereby to be cooled prior to mixing with the main body of the solution in compartment 5.

The solution employed may be either alcohol or calcium chloride, the compressor of the unit being regulated to maintain the solution at the desired temperature to keep the ice cream. A valve 15 is provided on the coil 10 so as to enable regulation of the flow of the brine through the coil 10 and thereby govern the amount of ice or frost that forms on the exposed part of the coil 10. An overflow pipe 16 is provided to govern the level of the body of water 11 in the cooling chamber 6.

From the above it will be apparent that a constant circulation of the brine is maintained through the coil 10 and that the invention makes provision for cooling of the compartment 6, due to the exposure of the upper third of the coil 10, which enables the part of the chamber 6 above the coil to be used as a storage chamber. In addition, the water 11 is cooled by the coil and maintains the container 8 cool, which correspondingly cools any liquid in container 8 before the latter is dispensed at the fountain, through pipes 17.

The refrigerating unit maintains the ice cream at the desired temperature by means of the refrigerated solution in the compartment 5, and by circulating the latter through coil 10 of compartment 6, the latter is similarly cooled and affords cooled storage space, which may be used as described for any purpose.

Brine in the ice cream compartment acts the same as air, in other words with an apparatus to cool the brine the warm brine will always rise to the top and it keeps up a constant circulation—the same as warm and cool air—so that the circulating brine coil in the cooler compartment allows the brine to pass therethrough. The circulation is caused by the brine absorbing the heat units in the cooling compartment, and, of course, as it gets warmer it becomes lighter and travels upward, the same as hot water, and when it travels upward more cold brine comes through. In this way it keeps up a constant circulation as long as there is a warmer condition in the cooling compartment.

What I claim is:—

1. In a soda fountain refrigerator, a casing, a partition in the casing dividing same into an ice cream compartment and a storage compartment, a refrigerating unit boiler in the ice cream compartment, a coil in the storage compartment disposed in juxtaposition to said partition and having an inlet leading from the bottom of the ice cream compartment and having an extension leading from the upper part of the coil, said extension having a discharge disposed over the boiler of the refrigerating unit, said storage compartment being formed to retain water or the like and the ice cream compartment being formed to contain a cooling media the coil in the storage compartment being partially submerged when the latter is filled with water, and means to control the level of the water in the storage compartment and thereby the extent of submergence of the coil.

2. In a soda fountain refrigerator a casing, a partition in the casing dividing same into an ice cream compartment adapted to contain a cooling media and a storage compartment adapted to contain water, a coil in the storage compartment located adjacent to the partition and being partially surbmerged when the latter is filled with water, said coil having an inlet leading from the bottom of the ice cream compartment, and an extension leading from the coil and having a discharge located adjacent to and over the boiler of the refrigerating unit.

In witness whereof, I have hereunto affixed my hand this 15th day of September, 1925.

HARRY J. MACKEY.